Nov. 11, 1958 T. S. PESSAGNO ET AL 2,860,177

TELEGRAPH SYSTEM

Filed March 31, 1955 4 Sheets-Sheet 1

INVENTORS
T. S. PESSAGNO
W. B. BLANTON
B. V. MAGEE

BY

M. R. Marsh
ATTORNEY

TELEGRAPH SYSTEM

Filed March 31, 1955 4 Sheets-Sheet 2

INVENTORS
T. S. PESSAGNO
W. B. BLANTON
B. V. MAGEE
BY
M. R. Marsh
ATTORNEY

INVENTORS
T. S. PESSAGNO
W. B. BLANTON
B. V. MAGEE
BY
M.R. Marsh
ATTORNEY

INVENTORS
T. S. PESSAGNO
W. B. BLANTON
B. V. MAGEE

BY M. R. Marsh
ATTORNEY 2,860,177
Patented Nov. 11, 1958

2,860,177

TELEGRAPH SYSTEM

Theodore S. Pessagno, West Nyack, and William B. Blanton, Rockville Center, N. Y., and Bruce V. Magee, Middletown, N. J., assignors to The Western Union Telegraph Company, New York, N. Y., a corporation of New York Application March 31, 1955, Serial No. 498,278

7 Claims. (Cl. 178—2)

Figure 1:
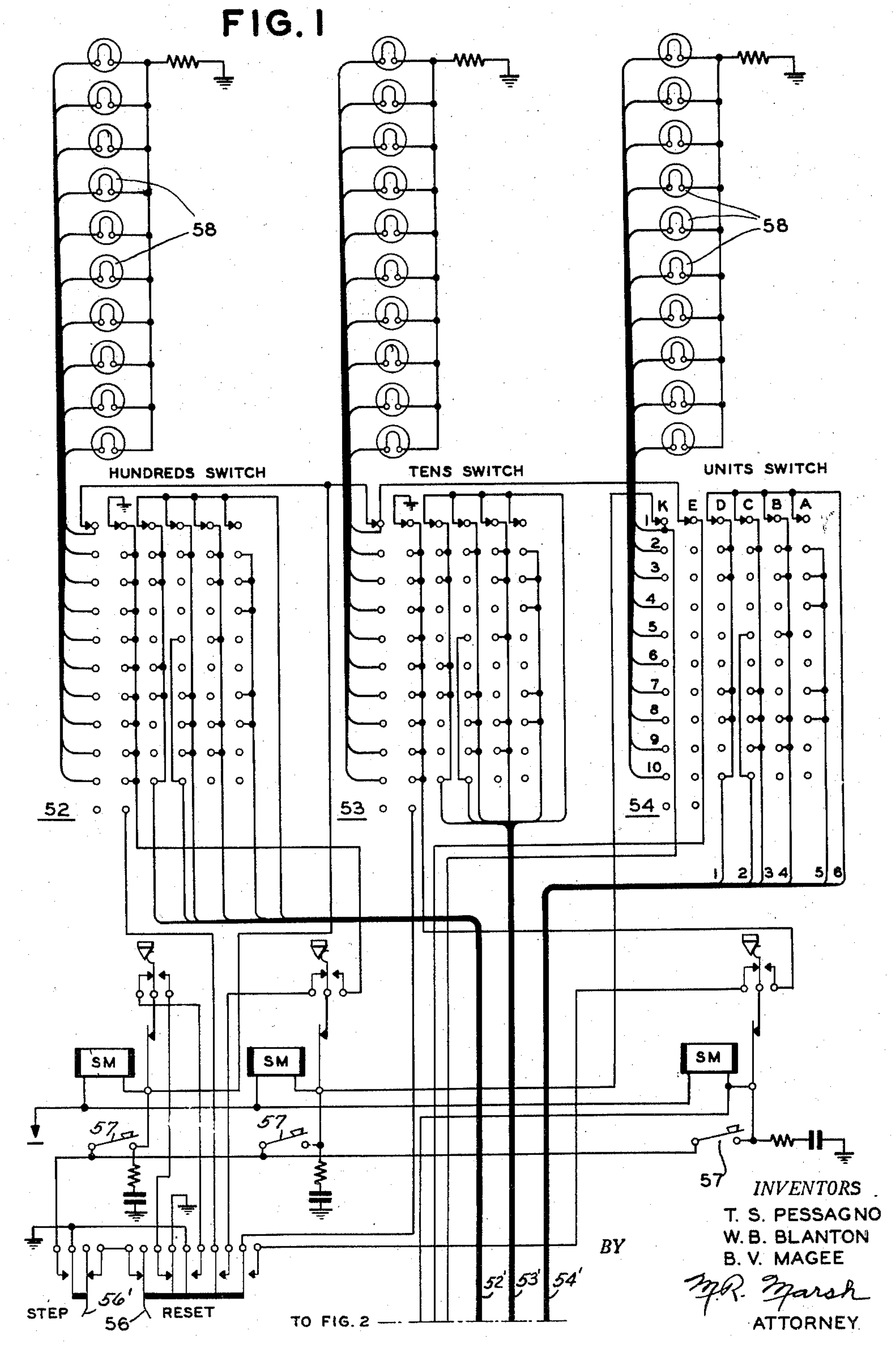

The present invention relates primarily to telegraph systems and more particularly to telegraph systems wherein a plurality of geographically separated telegraph stations are serially connected together by a so-called way-circuit. Such way-circuits usually treminate in a central relaying or switching office and normally the individual stations thereon only transmit messages to and receive messages from the switching office rather than receiving messages and transmitting to other stations on the way-circuit. Sometimes such way-circuits are operated on a single circuit basis or only in one direction at a time whereas other way-circuits are duplex operated or in both directions simultaneously, that is, one station may be receiving from the central office while another station is transmitting to the central office. In the following illustrative embodiment the principles of the invention are described as they may be applied to a single operated way-circuit, it being obvious that the principles are equally applicable to a duplex operated way-circuit.

Telegraph messages transmitted over either a way-circuit or a single station circuit are usually consecutively numbered in order to enable the tracing of lost or misdirected messages and in way-circuit operation where the messages are always transmitted from the central office, a separate number sequence is usually maintained for each station on the way-circuit. The message numbers are usually automatically transmitted ahead of a message and are automatically generated by so-called automatic message numbering machines, there being one such machine for each station on the circuit when individual number sequences are used. Where the central office has a message for a station on the way-circuit, the way-station may be selected by means of a push button which activates the respective numbering machine to transmit the number ahead of the message and the numbering machine in addition to transmitting the message selects or locks in the desired station and locks out the unselected stations so that the following message is recorded only at the selected station. The above arrangement requires a separate numbering machine for each station on a way-circuit and adds considerably to the cost, and for lightly loaded circuits the individual numbering machines may be required to operate only a relatively few times a day.

In view of the above, one of the primary objects of the present invention is to provide an arrangement for operation in conjunction with a way-circuit wherein a single numbering machine is employed and a single sequence of numbers for all messages transmitted over the way-circuit is maintained, and wherein the individual way-stations are selected and apprised of messages intended therefor by the appearance of their individual call letters in a predetermined position in a sequence of characters transmitted ahead of each message by the numbering machine.

A more specific object of the present invention is to provide an arrangement as set forth above and wherein an unselected station has a predetermined non-selecting letter in its assigned position and the presence of any letters other than the predetermined non-selecting or the assigned call letter in its position indicates the accompanying message has been missent.

Another object of the present invention is to provide an improved and more economical arrangement for detecting the missending of messages to stations on a way-circuit.

The above and further objects of the present invention will be more apparent in the following detailed description thereof wherein reference is made to the accompanying drawings.

Figures 2, 5:
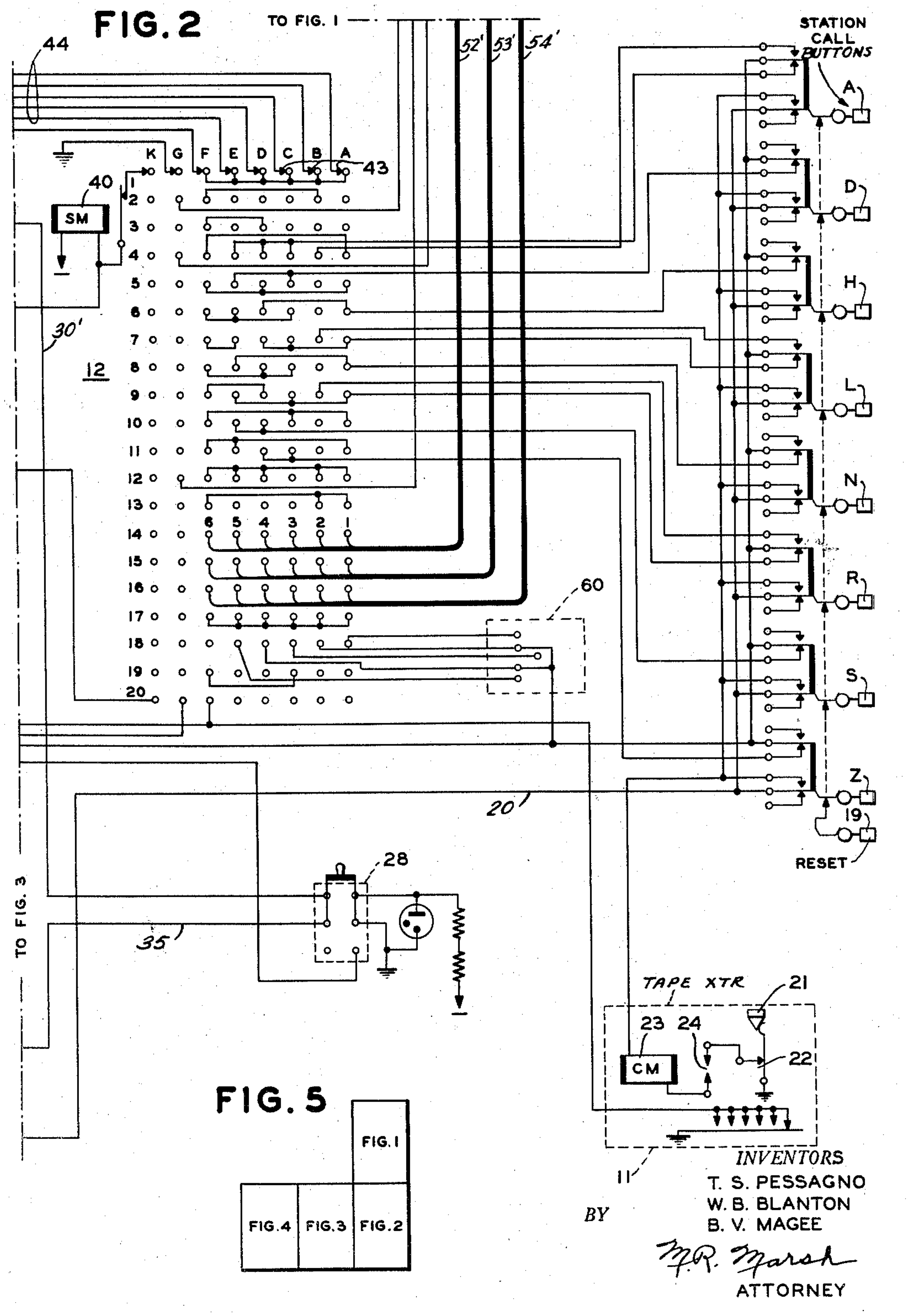

In the drawings:

Figs. 1, 2, 3 and 4 are circuit diargams of a sequence embodying the present invention; and Fig. 5 indicates the manner in which Figs. 1, 2, 3 and 4 may be arranged relative to one another to form a complete circuit.

In the illustrated and described embodiment of the present invention each way-station on the way-circuit is provided with station selecting means which may, for example, be similar in operation to the type disclosed in U. S. Patent No. 2,152,010 whereby the stations are called or locked in on the circuit in response to respective call characters to the exclusion of the uncalled stations. Thus any one or more of the stations on the way-circuit can be conditioned to receive a message from the central office.

In the described embodiment messages at the central office for the way-circuit stations are stored in a storage tape which controls a tape transmitter for transmitting the message signals, and also associated with the way-circuit is a single so-called automatic message numbering machine. A set of push buttons is provided, one for and representing each way-station on the circuit, and these push buttons control the automatic numbering machine to cause it to transmit along with a sequence number, selecting characters whereby only the desired stations are selected. With a message in a tape at the central office for one or more stations on the way-circuit, the attendant after determining the destination of the message in the control tape, which incidentally is usually printed as well as perforated, actuates the representative push botton and starts the tape transmitter. These operations initiate the operation of the automatic numbering machine which transmits to the way-circuit a signal causing all of the stations thereon to be called in, which is followed by a sequence of a predetermined number of characters containing one or more of the station call letters in assigned positions in the sequence or a predetermined non-selecting letter in such positions. The numbering machine then transmits the message number which is followed by a signal to release all of the uncalled stations so that only the selected one or more is in the operative condition to receive the following message. Thus each station on the way circuit is conditioned to record the sequence of characters including the selecting characters or call letters for the individual stations ahead of each message which is followed by the message number and the unselected stations are then released and the message copied or recorded on only the selected stations.

In the preferred arrangement the predetermined sequence of characters transmitted ahead of the automatic number will include as many characters as there are way-stations on the way-circuit with each station assigned a position in the sequence and either the letter X or the station call letters should appear in their assigned positions. For example, on a four-station circuit there will be four characters in the predetermined sequence and if it is assumed that the four stations have call letters N, R, S and Z, these call letters will represent the stations to which the message is intended. In accordance with the provisions of the invention, call letters such as N, R, S and Z in a four-station circuit are invariably transmitted in either the first, second, third or fourth position respectively of the predetermined sequence and the character X transmitted in place of one or more of these call letters when the respective station is not to be selected. Thus, in the assumed arrangement a message for the second station or the one with the call letter R, the predetermined sequence preceding the message number would be XRXX. Similarly, a message for the fourth station would be preceded by the sequence XXXZ. Accordingly any character but an X or a Z in the fourth position of the sequence would inform the attendant at station Z that the accompanying message might be intended therefor and she should check with the central office for the correct destination of this particular message. However, the absence of the Z character would not lock in the Z station and the message would not be recorded thereat. In this case station Z would request the central office to retransmit the message thereto.

Thus with the arrangement of the present invention a more economical automatic message numbering system is provided and each station normally received only the messages intended therefor and needs to check for only its particular call letter in its assigned position or the letter X in the sequence preceding the automatic number.

Referring now to the drawings the detailed operation of the circuits and the items of equipment included in the system will now be described in conjunction with the transmission of a message from the central office to selected ones of the way stations. The circuits of the associated equipment at the central office are shown in detail while eight way stations associated with the way-circuit are represented by rectangles A, D, H, L, N, R, S and Z, Fig. 4. The principal items of equipment at the central office includes a tape transmitter 11, Fig. 2, adapted to sense a control tape, a series of station call push buttons, one for each station on the way circuit and indicated by reference characters A, D, H, L, N, R, S and Z, Fig. 2, a numbering machine comprising rotary switches 12, Fig. 2, 52, 53 and 54, Fig. 1, a distributor transmitter 14, Fig. 3, two electronic timers 16 and 17, Figs. 3 and 4 respectively, and various control relays.

Each way-station such as stations A, D, etc., on the way-circuit are equipped with sending and receiving equipment such as a teleprinter and a way-station selector of the type adapted to control the association of the teleprinter with the way-circuit. The way-station selectors at each of the way-stations operates in the well known manner and may be of the type that in response to a long open line signal starts the motor of the teleprinters. This conditions all the way-stations to respond to following line signals and in accordance with the normal operating procedure the call letters of the desired station or stations are then transmitted and recorded at all of the way-stations on the circuit. Normally the call letters of the various stations are transmitted in a predetermined and fixed sequence or in their place the letter X is transmitted. After the sequence of call letters and X's and a message number, a space signal is transmitted which functions and controls the way station selectors to disassociate the unselected stations from the way-circuit so that these unselected stations do not record the following message.

Figure 4:
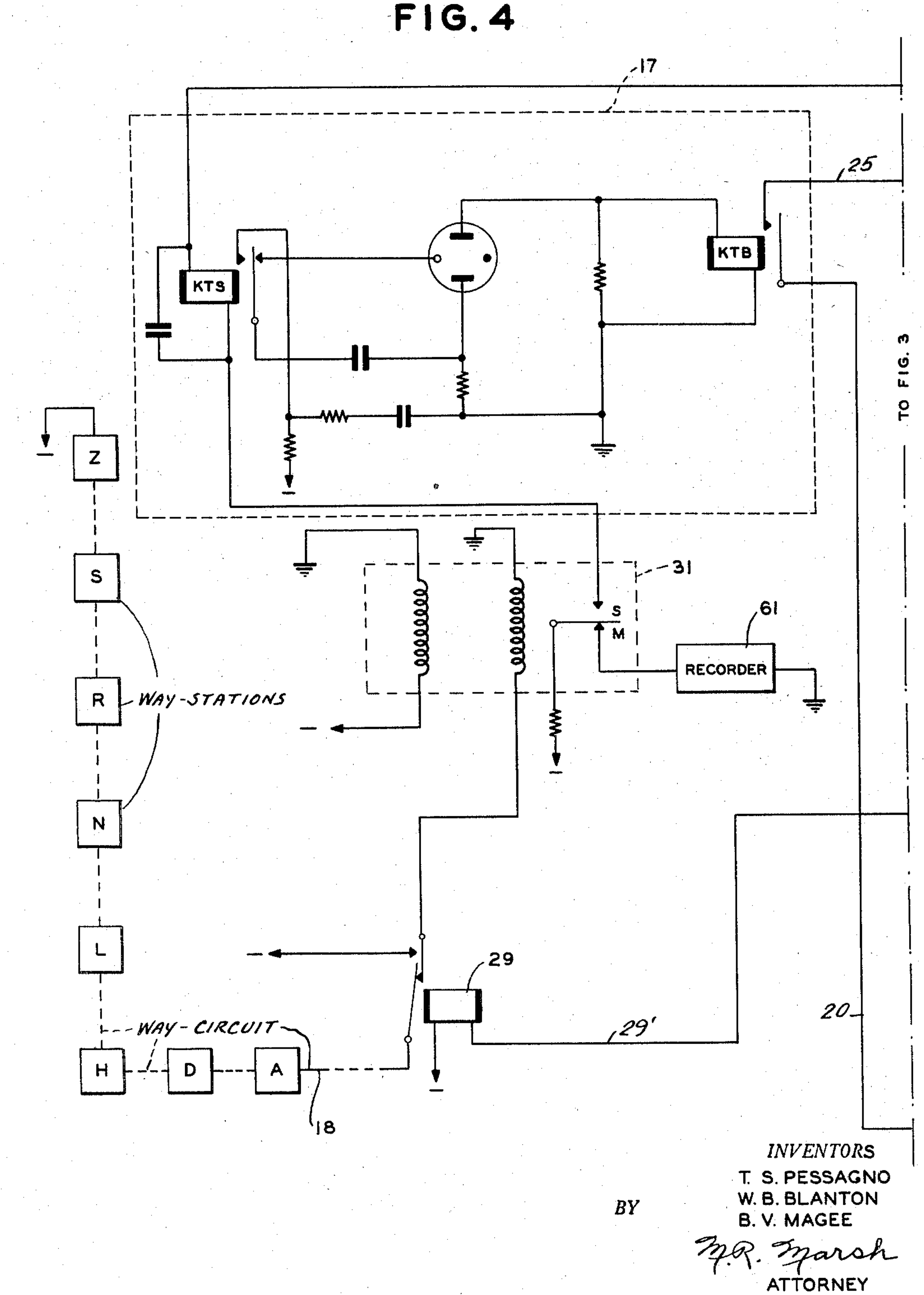

It will now be assumed that a message is stored in a perforated tape and that it is desired to transmit this message to some of the stations such as stations A and D on the way-circuit 18, Fig. 4. The operator at the central station after determining the stations to which the message is to be transmitted, in the assumed case stations A and D, will depress station call buttons A and D, Fig. 2. In the preferred arrangement the station call push button A, D, H, etc., are self-locking and retain their operate position when once depressed. A reset push button 19, Fig. 2, mechanically releases any of the operated push buttons and is usually operated before any of the station call push buttons are operated.

Next the attendant inserts the leading end of the message tape in the tape transmitter 11, Fig. 2, and in so doing depresses the feed wheel release lever 21 to disengage the feed wheel detent from the feed wheel (not shown). This opens at contacts 22 a circuit to the clutch magnet 23 of the tape transmitter 11 and with the tape advanced sufficiently the tape-out contacts 24 also in the clutch circuit are closed.

After the tape has been properly inserted in the transmitter, the feed wheel release lever 21 may be released which permits the feed wheel to engage the feed holes of the tape and the contacts 22 to close. If at this time none of the way-stations are transmitting or the way-circuit 18, Fig. 4, is idle, relay KTB, Fig. 4, in the timer 17 will be energized and a circuit will be completed from ground through contacts 22, 24 and the coil of the clutch magnet 23 of the tape transmitter 11, a make contact of the lower set of one or more of the operated ones of the station call push buttons such as A and D, conductor 20, a make contact of relay KTB, conductor 25, the left-hand winding of relay NIR, Fig. 3, the resistance 26, and the right-hand coil of relay NIR to potential at 27. The resistance 26 limits the flow of current in the above circuit to such a value as to prevent operation of the clutch magnet 23 but it is of sufficient value to operate relay NIR.

Figure 3:
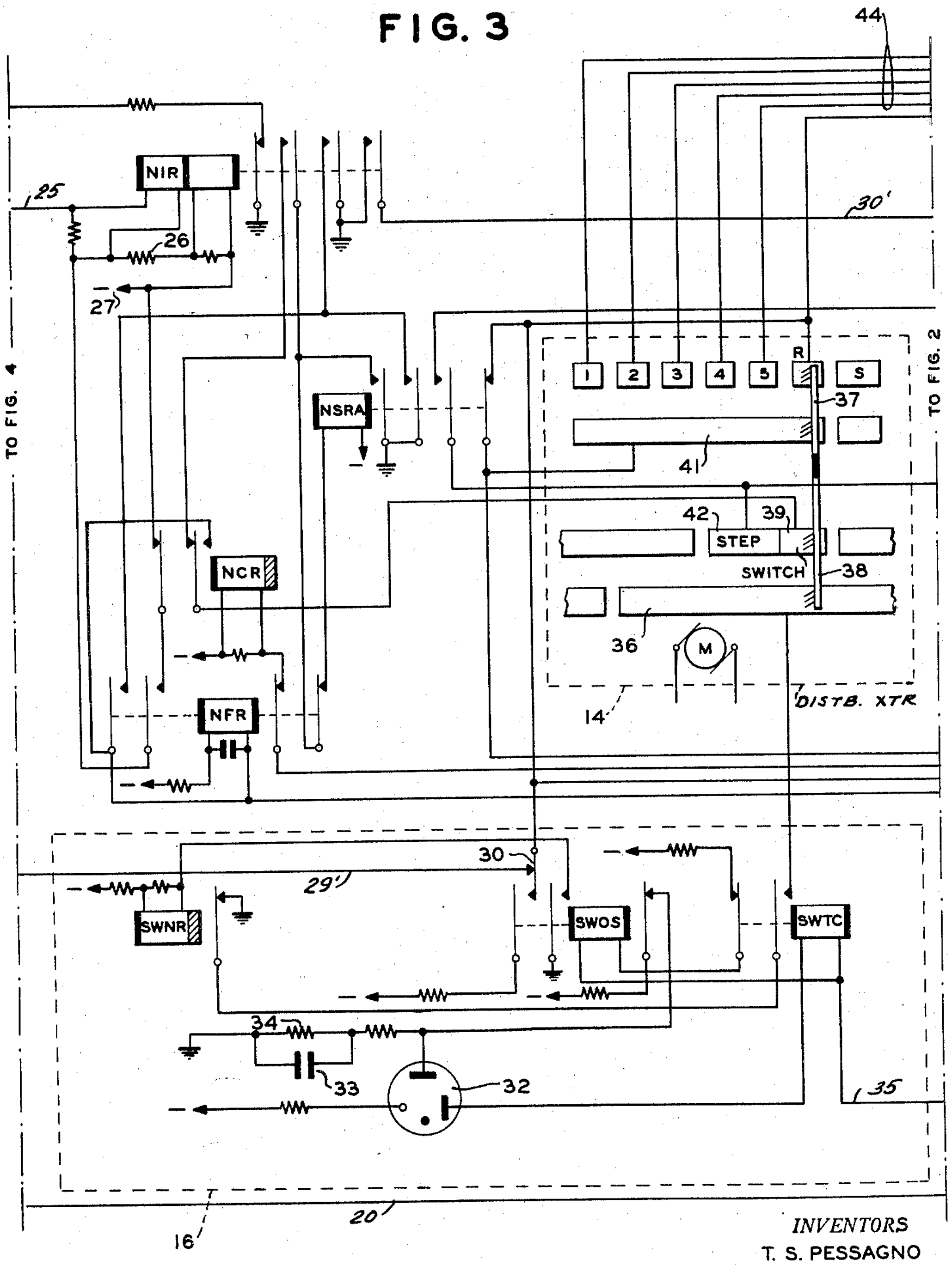

As relay NIR operates, ground is applied to its outer tongue and over a circuit including conductor 30', an omit-number switch 28, Fig. 2, conductor 35, the coil of relay SWOS, Fig. 3, of the timer 16 and back contacts of relay SWTC to negative potential. Through its inner tongue relay NIR in operating interrupts a circuit for relay KTS in timer 17 which prevents the release of relay KTB after the circuit has been seized. Relay NIR in operating also prepares a circuit for the subsequent operation of relay NSRA, Fig. 3, and prepares a locking circuit for relay NFR, Fig. 3.

The completion of the above described circuit through the coil of relay SWOS as the result of the energization of relay NIR operates relay SWOS to initiate the transmission of a long open to the way-circuit. This long open is transmitted by opening the normally closed circuit through the operated relay 29, Fig. 4, at contacts 30 of relay SWOS. The release of relay 29 interrupts the line circuit extending through the contacts thereof and applies negative potential through the operating coil of polar line relay 31, Fig. 4. Relay SWOS in operating also completes a circuit for the operation of slow-to-release relay SWNR, Fig. 3, and also through its inner right-hand tongue removes negative potential from the control electrode of a vacuum tube 32. This permits the condenser 33 to start discharging and in the arrangement disclosed the value of the condenser 33 and resistance 34 are such that the timer condenser discharges sufficiently in approximately five seconds to cause the vacuum tube 32 to fire and completes a circuit for the operation of relay SWTC. The circuit for operating relay SWTC is from ground through closed contacts of relay NIR, conductor 30', the omit-number switch 28, the winding of relay SWTC, the vacuum tube 32 to negative potential.

As relay SWTC operates, it opens the operating circuit for relay SWOS causing it to release and through a make contact prepares a step and switching pulse circuit to the ring 36 of the distributor 14, Fig. 3. The release of relay SWOS causes reoperation of relay 29 which recloses the way-circuit 18 to terminate the long-open being transmitted at this time to the way-circuit. Relay SWOS in releasing interrupts the operating circuit to the slow-to-release relay SWNR which subsequently releases. The release time of relay SWNR is sufficient to permit the teleprinters at way-stations to come to rest after the termination of the long-open before the start of any transmission from the switching center. The release of relay SWNR completes the ground circuit to the ring 36 of distributor 14.

At this time the long open has been transmitted and terminated from the central office and all the teleprinters at the way stations are activated or in condition to receive the following code signals transmitted to the way-circuit. The control circuits are now in condition to transmit the call letters of the desired stations and the sequence number of the message if such is to precede the message.

The distributor 14, Fig. 3, has a pair of constantly rotating brushes 37 and 38 called line brushes and local brushes, respectively, continuously wiping over associated rings and segments. When the line brush 37 reaches the rest segment R of its associated pair of rings the local brush 38 will be wiping across the switching segment 39 associated with ring 36. As described ring 36 has ground at this time applied thereto and the brush 38 will extend this ground over a circuit including a back contact of relay NCR, a front contact of operated relay NIR, a back contact of relay NFR, the coil of relay NSRA to potential, causing the latter relay to operate. As relay NSRA operates, it locks up through its own contact independently of a part of the above described circuit. Relay NSRA in operating also establishes an alternate locking ground for relay NFR which insures, as hereinafter described, that the numbering machine completes its cycle once it has started, if for some reason relay NIR should release. Relay NSRA also removes the shunt around the sending ring 41 and associated segments traversed by brush 37 and completes a circuit from the step segment 42 of distributor 14 to the step magnet 40, Fig. 2, of the numbering machine rotary switch 12.

Included in the numbering machine is the rotary switch 12 which as shown comprises a plurality of wipers 43 identified by the letters A, B, C, D, E, F, G and K which successively contact associated studs of respective levels in the switch. In the drawings, the studs of the eight levels of the rotary switch 12 are shown in vertical rows of twenty studs each. Normally, the wipers 43 contact the upper horizontal row of studs in their respective vertical rows or the so-called home position of the switch. With relay NSRA operated and with the way-circuit in a closed condition, the F wiper 43 has negative potential through the coil of relay 29, conductor 29' contacts 30, applied thereto which by means of a strap is extended with the switch 12 in its home position to the A to E studs. Accordingly, with the switch in the home position this potential through conductors 44 is connected to the A to E wipers 43 and applied to the five code pulse segments 1 to 5 associated with the ring 41. Thus, an all-marking code combination is transmitted to the line as the brush 37 wipes across the five code segments associated with ring 41. Concomitantly with the transmission of the above code, the brush 38 completes a circuit to the step magnet SM of rotary switch 12 to cause the wipers to be advanced to their second position. The first six studs from the right in the second position of the rotary switch 12 are so connected as to set up a line feed combination on the pulse segments associated with brush 37 and accordingly the next revolution of the brush 37 causes a line feed combination to be transmitted to the way-circuit. Similarly, the third position of the rotary switch is arranged to cause a carriage return code combination to be transmitted to the way-circuit on the following revolution of the brush 37.

The first six studs from the right in the fourth to eleventh positions, inclusive, of the rotary switch 12 are interconnected in a predetermined manner and certain studs thereof extended to contacts of associated station call push buttons A, D, H, L, N, R, S and Z. With the station call push buttons in their normal unoperated positions, the interconnections of the studs in the fourth to eleventh positions are such that an X code combination is set up on each set of studs. With one of the station call letter buttons in an operated position, the character set up by its associated set of studs is the same as that assigned to the station call push button. For example, with reference to the station call button A, which is connected to the fourth row of studs on the rotary switch, the connections between the studs and the contacts of the button are so arranged that when the wipers 43 reach this position, the potential on the F wiper is supplied directly to the first stud of this set and through the contacts of the station call push button to the third, fourth and fifth studs while the second stud has no connection thereto. The character X is represented by the first, third, fourth and fifth pulses thereof being marking and the second spacing, and accordingly with the wipers of the switch in the fourth position and the station call push button A unoperated, the code combination for X is set up on the pulse segments 1 to 5 associated with the brush 37. Accordingly, with station push button A unoperated, an X character is transmitted to the line during the revolution of the brush 37 in which the wipers 43 of the rotary switch 12 are in their fourth position.

The connections to the five studs in the fourth position of the rotary switch through the station call push button A are such that with the push button operated, potential is applied to only the first and second from the right or the A and B studs of this set, and accordingly with the wipers thereon an A code combination will be set up on the pulse segments of the distributor 14. The letter A is represented by the first and second pulses thereof being marking and the third, fourth and fifth spacing.

Similarly, the fifth to the eleventh set of studs on the rotary switch 12 are interconnected to their respective station call push buttons D, H, L, N, R, S and Z, respectively, and with the push buttons unoperated, X's will be transmitted as the wipers of the rotary switch are stepped to these sets of studs, whereas with any one or more of the station call push buttons operated, a representative station call letter code is set up on its associated row of studs. The brushes or wipers are advanced concomitantly with the transmission of a code group by a circuit to the step magnet SM from the step segment 42. The twelfth and thirteenth positions of the rotary switch are so connected that a figures code and a hyphen code are transmitted when the wipers are in these positions.

The station call push buttons A, D, etc. can be operated in any order desired to select one or more stations on the way-circuit to which the message is to be sent. However, a particular station call letter is invariably transmitted in its assigned position in the sequence or the letter X is transmitted in its place. For example, the call letter A is assigned to the first position in the eight letter sequence, and normally the letter A or the letter X will appear as the first character of the sequence. If the letter A occurs, the attendant at station A knows that the following message is intended for station A, and if the letter X occurs, the attendant knows that the message is intended for one or more of the other stations depending upon what call letters are transmitted in the remainder of the call letter sequence code. Should some other letter than A or X be recorded on the printer at station A, the attendant thereat which know that the first code of the call letter sequence had either gained or lost one or more signal pulses and would accordingly communicate with the central office to determine whether or not the message was intended for station A. Each of the other way-stations has an assigned position in the call letter sequence group and checks that position to determine whether its call letter or the letter X is recorded thereat. While the arrangement has been described with a sequence of eight call letters in the call letter sequence group, it is obvious that a different number could be employed where a different number of way-stations are connected to the way-circuit.

In the arrangement disclosed each message transmitted over the way circuit is consecutively numbered and it is while the rotary switch 12 is in its fourteenth, fifteenth and sixteenth positions that the sequence number of the message is transmitted. Where desired, the sequence number may be omitted. The six studs on the right in the fourteenth position of the rotary switch 12 are connected by a cable 52' with studs and wipers of a so-called hundreds rotary switch 52, and the studs in the 15th and 16th positions are connected by cables 53' and 54' to a so-called tens and units rotary switch 53 and 54, respectively. The connections to the rotary switches 52, 53 and 54 are such that consecutive three digit numbers are set up on the studs of the 14th, 15th and 16th positions of the rotary switch 12 and are automatically changed in conjunction with each cycle of operation of the rotary switch 12 so that each message is accompanied by a consecutive numerical series of numbers. A common reset switch 56, Fig. 1, is associated with the rotary switches 52, 53 and 54 which when operated resets them for beginning of a new series of numbers. Also a common step switch 56' and individual step switches 57 one for each of the rotary switches 52—54 enables each one to be stepped one step at a time. A series of ten neon lamps 58, one series for each of the rotary switches 52—54, are arranged to glow and indicate the position of the switches whereby the attendant can determine the message number to be transmitted.

By means of the Omit Number switch 28, the attendant at the central office may arrange the circuit to prevent the transmission of a number by disabling the circuit to the numbering machine and any message transmitted with the switch 28 in its lower position will not have a number appended thereto.

When the wipers of rotary switch 12 reach their 17th position, the studs thereof are strapped to cause a letters character to be transmitted, and the first five studs from the right in the 18th position of the rotary switch are connected by means of a dummy plug 60 to cause the call letter of the central office to be transmitted to the way-circuit. By means of the dummy plug 60 the call letter may be readily changed. On the advancement of the wipers of rotary switch 12 to the 19th position, a space character is transmitted and in the 20th a blank is transmitted. At all of the way-stations on the circuit the teleprinters were started in response to the long open initially transmitted and the call letters transmitted as the result of operating certain of the station call letter push buttons lock their respective stations in on the circuit, and the space character transmitted in the 19th position of the switch 12 locks out the uncalled stations. Thus the characters transmitted during a cycle of operation of the rotary switch 12 are recorded at all of the way-stations and the following message only at one or more of the stations selected. In advancing to the 20th position, the G wiper of the rotary switch 12 applies a ground through back contacts of relay NFR to the coil of slow-to-operate relay NCR, Fig. 3. The time required for the G wiper to reach its 20th position plus the operating time of relay NCR is such that the local brush 38 of the distributor 14 will have left the switching segment 39 before relay NCR operates. This insures that the code set up on the code studs in the 20th position of rotary switch 12 (in this case a blank) will be transmitted to the line before the numbering machine is cut out of the circuit.

Operation of relay NCR transfers the circuit from the switching segment 39 of distributor 14 to the coil of relay NFR and opens the shunt around the coil of relay NIR. Now as the distributor brush 38 wipes across the switching segment 39, a circuit is completed from ground, front contact of relay NCR, and the coil of relay NFR to potential. Relay NFR thereupon operates and locks up through make contacts thereof and parallel circuits through make contacts of relay NIR and make contacts of relay NSRA. As relay NFR operates, the locking circuit for relay NSRA is opened as well as the operating circuit for relay NCR and a shunting circuit is prepared around the resistor 26 and the left hand winding of relay NIR. The release of relay NSRA shunts out the numbering machine transmitting circuit and the circuit to the step magnet SM thereof.

As relay NCR releases it completes the shunt across the resistance 26 and the right hand coil of relay NIR so that the current through the clutch magnet 23 of the transmitter 11, Fig. 2, is sufficient to operate the same. Relay NIR, however, remains operated by the higher current flowing through its left hand coil. The energization of the clutch magnet 23 of the transmitter 11 starts operation thereof whereby the message in the tape is transmitted to the way-circuit. When the transmitter 11 reaches the end of the tape denoting the end of the message, the end of the tape in advancing through the transmitter permits the tape-out contacts 24 to open. This opens the above described circuit through the left hand coil of relay NIR permitting it to release followed by the release of relays NFR and SWTC. This restores the circuits to their normal idle condition.

As will be noted, relay 29 operates in response to the signal codes transmitted from the distributor 14, Fig. 3, and it in conjunction with relay 31 prevents the recorder 61 at the central office from operating in response to the signals transmitted from the central office. The recorder 61 responds to incoming signals. The timer 17 associated with the circuits operates to open the circuit to relay NIR while a way-station is sending to the central office. The timer delays the completion of the above circuit for a predetermined length of time after a way-station has ceased to transmit.

While the invention has been described in but a preferred embodiment thereof, it will be obvious that various modifications can be made therein without departing from the spirit or essential attributes thereof, and it is desired therefore that only such limitations be placed thereon as are specifically set forth in appended claims.

What is claimed is:

1. In a multistation telegraph system, a central office, a plurality of other stations, a line connecting said other stations to said central office, means for transmitting messages from said central office to said line, means for automatically preceding each message transmitted to said line by a sequence of a predetermined number of signals including nonselecting code signals one for each of said other stations, and means manually operable prior to the transmission of a message for conditioning said station nonselecting code signal transmitting means to selectively change one or more of the nonselecting code signals to station code signals whereby station selecting code signals representative of selected ones of said other stations which are to receive the following message are transmitted.

2. In a multistation telegraph system, a central office, a plurality of other stations, a line connecting said other stations to said central office, a tape controlled transmitter for transmitting messages from said central office to said line, means for automatically preceding each message transmitted to said line by a sequence of signals including a code signal for each of said other stations, a manually operable element for each of said other stations, and means controlled by each of said elements to change one of said code signals from a nonselecting code to a station selecting code whereby station selecting code signals representative of actuated ones of said manually operable elements precede messages transmitted from said tape transmitter.

3. In a multistation telegraph system, a central office, a plurality of other stations, a line connecting said other stations to said central office, said other stations having recorders normally unresponsive to code signals transmitted over said line, means at said central office for automatically transmitting, along with message code signals, signals to associate all of said other stations with said line and thereafter transmit a sequence of code signals, one code signal for each of said other stations with each of said stations assigned a position in said sequence, the code signals in said sequence being either a common predetermined nonselecting code or a selecting code assigned to its representative station and means for thereafter transmitting a disabling signal to disable the recorders at the nonselected stations whereby messages intended for a station are indicated by recording thereat its assigned selecting code in its assigned position in said sequence and messages not intended for a station are indicated by recording thereat prior to the transmission of said disabling signal the common predetermined nonselecting code in the station's assigned position in the sequence.

4. In a way-station telegraph system, a central office, a plurality of way-stations, a way-circuit connecting said way-stations to said central office, message transmitting means at said central office, a manually operable element at said central office individual to each of the way-stations on said circuit, means including said manually operable elements for transmitting ahead of each message from said message transmitting means way-station selecting characters, said selecting characters being transmitted in a predetermined sequence regardless of the sequence of operation of said manually operable elements, and means for preventing said message transmitting means from starting the transmission of a message until at least one of said manually operable elements has been operated.

5. In a way-station telegraph system, a central office, a plurality of way-stations, a way-circuit connecting said way-stations to said central office, message transmitting means and an auxiliary transmitting means at said central office, a manually operable element at said central office for each of the way-stations on said circuit, means including said manually operable elements for controlling said auxiliary transmitting means to transmit ahead of each message from said message transmitting means way-station selecting characters representing actuated ones of said elements, said selecting characters being transmitted in a predetermined sequence regardless of the sequence of operation of said manually operable elements, and means for preventing said message transmitting means from starting the transmission of a message until at least one of said manually operable elements has been operated.

6. In a way-station telegraph system, a central office, a plurality of way-stations, a way-circuit connecting said way-stations to said central office, message transmitting means at said central office, an auxiliary transmitting means at said central office having a cycle of operation in which a code signal for each of said way-stations is transmitted ahead of each message from said message transmitting means, a manually operable element at said central office for each of the way-stations, means includign said manually operable elements for changing a code signal transmitted by said auxiliary transmitting means from a non-station selecting code to a station selecting code, said non-station and station selecting codes being transmitted in a predetermined sequence regardless of the sequence of operation of said manually operable elements, and means for preventing said message transmitting means from starting the transmission of a message until at least one of said manually operable elements has been operated.

7. In a way-station telegraph system, a central office, a plurality of way-stations, a way-circuit connecting said way-stations to said central office, message transmitting means at said central office, an auxiliary transmitting means at said central office normally operable to automatically transmit ahead of each message transmitted from said message transmitting means a sequence of code signals including a non-station selecting code signal for each of said way-stations with each of said way-stations assigned a position in said sequence, a manually operable element at said central office individual to and assigned to each of the way-stations, means including a manually operable element operated prior to the operation of said auxiliary transmitting means for changing a code transmitted by said auxiliary means from a non-station selecting code to a representative station selecting code, and means for preventing said message transmitting means from starting the transmission of a message until at least one of said manually operable elements has been operated.

References Cited in the file of this patent

UNITED STATES PATENTS

| | | |
|---|---|---|
| 2,735,884 | Blanton | Feb. 21, 1956 |
| 2,739,180 | Britt | Mar. 20, 1956 |